Sept. 17, 1968  K. H. CARY ET AL  3,402,306
COMPENSATING MEANS FOR A PIEZOELECTRIC SENSING ELEMENT
Filed June 28, 1966
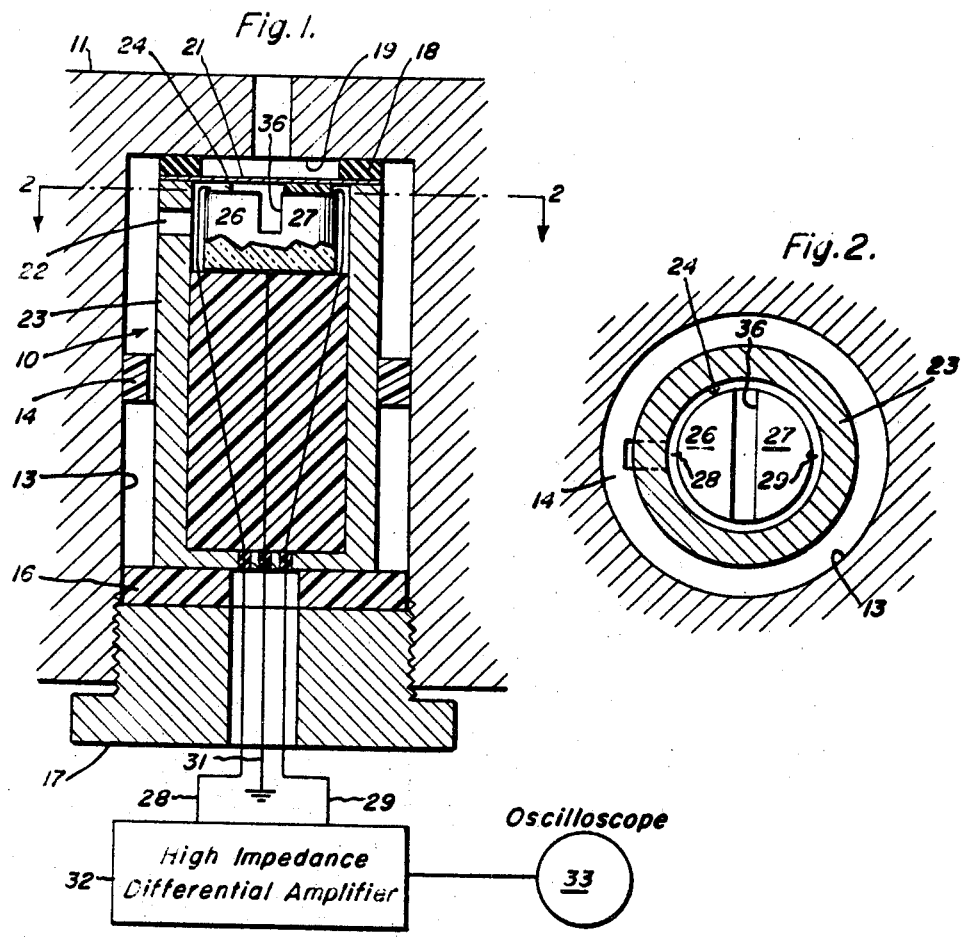
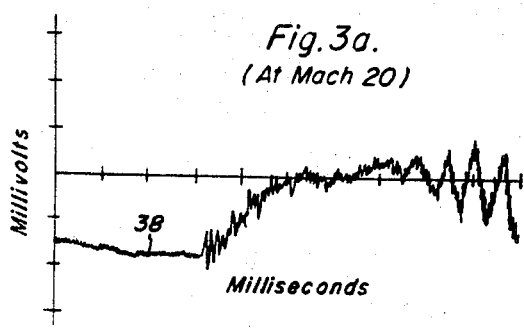
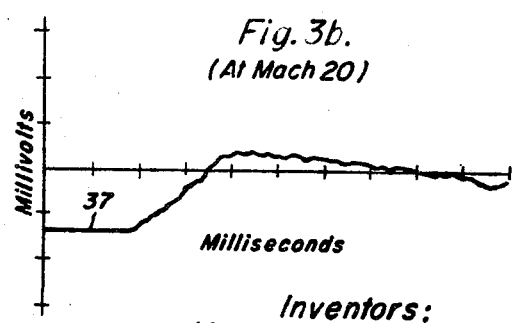
Inventors:
Kenneth H. Cary;
Bruce C. Graber;
Henry T. Nagamatsu;
Russell E. Sheer, Jr.,
by
Their Attorney.

United States Patent Office 3,402,306
Patented Sept. 17, 1968

3,402,306
COMPENSATING MEANS FOR A PIEZOELECTRIC SENSING ELEMENT
Kenneth H. Cary, Gansevoort, and Henry T. Nagamatsu and Russell E. Sheer, Jr., Schenectady, N.Y., and Bruce C. Graber, Norristown, Pa., assignors to General Electric Company, a corporation of New York
Filed June 28, 1966, Ser. No. 561,254
7 Claims. (Cl. 310—8.7)

This invention relates to piezoelectric crystal sensing elements and more particularly to improved compensating means to improve the accuracy of such sensing elements.

As is well known, when force is exerted upon a crystal of certain crystalline substances known as piezoelectric crystals, a small voltage is generated, which voltage is proportional to the extent to which the crystal deflects or undergoes a change in volume. Unfortunately, the piezoelectric crystal is unable to distinguish between desired and extraneous (undesired) forces applied thereto and, when such a situation exists, the voltage output from the crystal accurately represents the desired force-exerting parameter only to the extent that the extraneous forces are very small relative to the magnitude of the desired force. As the magnitude of the extraneous force(s) increases in proportion to the desired force, the usefulness of the output of the sensing device diminishes in the absence of means having the capacity to select the desired force (or its signal) and reject the extraneous force(s) (or its signal).

The sensing of extremely small pressures induced behind advancing hypersonic shock waves is very difficult and requires highly effective compensating means for minimizing the content of undesired signal components in the signal output from any sensing device so employed. Such an application, therefore, serves as a rigorous test for the evaluation of vibration and acceleration compensating means for piezoelectric sensing elements, although it is not intended that the compensated sensing element of this invention shall be limited to this exemplary use.

Investigations into the effects of various body shapes upon the behavior of shock waves directed thereagainst have been conducted at speeds as high as about Mach 20 using such very sensitive and accurate pressure gages as the gage described in U.S. 3,031,591, Cary et al., with considerable success. However, as the speed of the shock wave has been increased above Mach 20 and pressures as small as about 3 microns of mercury have been encountered for detection, the inclusion of the effect of extraneous, undesired forces on the output signal from the piezoelectric sensing element has become considerably magnified and has made an accurate determination of the pressure profile impossible.

These undesired forces are inherently generated by the creation and release of the hypersonic shock wave itself. Typically, high Mach number flows are obtained by burning an explosive mixture of gases in a contained volume, wherein reflected shock waves are generated and directed via an expansion nozzle of selected configuration against various test configurations at the desired speed.

Simultaneously with the generation and transmission of the shock wave is the generation of at least two extraneous forces, which are transmitted to the test model and, therefore, to any sensing means housed therein. Such extraneous forces are, for example, vibrations created at the time of the generation of the explosion and reflection of the shock wave. These vibrations are transmitted to some extent through the supporting construction in spite of vibration-isolating means and thence to the model via the mounting means therefor. In addition to the vibratory forces finding their way to the model, acceleration forces are also exerted upon the unsupported forward end of the model as the shock wave strikes. The desired forces, those for which the sensing device has been installed in the model, occur directly behind the passing shock wave and are transmitted to the piezoelectric sensing element by some means for sensory input of the signal to be detected. In addition, in spite of all means to structurally isolate the piezoelectric crystal from the structure in which it is mounted, the piezoelectric crystal also receives the aforementioned vibratory and acceleration forces superimposed thereon in sufficient magnitude to prevent the establishment of the pressure profile with the desired accuracy.

It is, therefore, the prime object of this invention to provide compensating means for a piezoelectric sensing element to enable the separation of extraneous signal components from desired signal components whereby ultra-sensitive force detection and evaluation becomes possible.

It is another object of this invention to provide a method for matching the frequency response of a pair of connected piezoelectric crystal sensing elements over a range of frequencies up to at least about 25,000 cycles per second.

It is a further object of this invention to provide compensation for extraneous disturbances to which a dynamic force-sensing piezoelectric crystal may be subjected during operation thereby enabling successful use of such sensing elements in applications encountering vibration and/or acceleration forces.

It is still another object of this invention to provide a compensated pressure sensing element capable of separately indicating a single force in a multiforce system, which force has a magnitude smaller than the force exerted by 20 microns of mercury.

The above objects are attained by the practice of this invention wherein a split piezoelectric crystal is employed retaining a region of common connection between the portions of the split crystal, which region of common connection ranges from about 35 to about 70 percent of the cross-sectional area of the parent crystal measured in the plane of separation. In use, one-half only of the split crystal face is exposed to the dynamic force to be sensed, and the other half is free of solid contact, while the opposite (unbroken) face is exposed to the uniform application thereto of the extraneous (undesired) forces for which compensation is required.

These and other features, objectives and advantages will be better understood when considered in connection with the following description and the drawings in which:

FIG. 1 is a cross-sectional view of an embodiment of this invention mounted in position in a body for sensing the application of a pressure force thereto;

FIG. 2 is a sectional view taken on line 2—2 of FIG. 1; and

FIG. 3, which comprises FIGS. 3a and 3b, indicates the variation of signal output expressed in millivolts (the signal is proportional to pressure) as a function of time for a prior art device of considerable sensitivity and for the device of this invention, respectively.

Referring now to FIG. 1, there is illustrated a preferred embodiment of this invention in the form of a dynamic pressure measuring gage. The gage 10 is mounted in a test model, which in turn is to be located within the reservoir section of a hypersonic shock tunnel (not shown). Gage 10 is mounted below the the surface of the model structure 11, but in communication with the surface via a small hole 12. Because of the high degree of compensation offered for extraneous forces by the construction of this invention, gage 10 need not be isolated from structure 11 to the extent employed in previous construction and mounting thereof in recess 13 is easily facilitated by the use of a simple washer, or spacer, 14 made of a vibration damping material such as polytetrafluoroethylene. A washer 16 of similar material is shown disposed at the inner end of gage 10 and abutting this washer 16 exerting pressure thereagainst is nut 17. The necessity for this biasing action by nut 17 is in order to insure the sealing of the rubber ring 18 against shoulder 19. In this manner, the pressure to be sensed can be applied only to diaphragm 21 and will not have access to vent 22. Vent 22 is provided in this embodiment, because gage 10 is assembled at atmospheric pressure, while the operative environment therefor will be at a much lower pressure. Thus, vent 22 enables equalization of the reduced pressure on both sides of diaphragm 21 prevailing in the reservoir section before the initiation of the changed pressure conditions due to the passage of the shock wave.

Housing 23 of gage 10 accommodates the piezoelectric sensing element 24 split into halves 26 and 27 as shown to form frequency-matched sensing elements. As shown, element 27 is affixed to stainless steel diaphragm 21 by means of a layer of rigid material, i.e., epoxy cement. The opposite surface of piezoelectric crystal 24 (the uncut surface common to elements 26 and 27) is bonded to a similar cement material in order to fix its position in housing 23.

Electrical connections are made to piezoelectric crystal 24 (the faces of which have previously been coated with a conducting layer as, for example, silver) by means of leads 28, 29, 31, which latter lead is grounded. Coupling the output from crystal 24 through a high impedance differential amplifier device 32 to an oscilloscope 33, enables a convenient display of the nature of the transient pressure signal. A commercial differential amplifier (Tektronix 122 Preamplifier as manufactured by Tektronix Inc.) was modified slightly by changing an input resistor to 100 megohms to provide a high impedance input. The amplification factors of the amplifier were 100 and 1000.

The completely unexpected feature of this invention is the critical nature of the relationship required between the pair of piezoelectric crystals necessary to match, or correlate, these crystals over a wide range of frequencies. A number of alternate attempts to produce the requisite frequency matching of crystals, all of which attempts either were unsuccessful or produced only a slight improvement over earlier devices included the following: (1) two separate crystals not previously connected were employed with only one of the crystals being connected to diaphragm 21; (2) two separate crystals cut from the same parent crystal (formed by splitting a single crystal) were connected in a manner similar to that described in (1); (3) the piezoelectric crystal was kept whole except to provide a slot through the metal coating at the top of crystal (but not extending into the body of the crystal itself) with one separate portion of the metallic coating being connected to the steel diaphragm and the other being disconnected therefrom with the underside of the crystal being supported as shown in FIG. 1; (4) cuts of various depths were made into the piezoelectric crystal leaving connecting area between the partially separated crystals outside the range of from 35–70 percent of the cross-section at the slot (it was found that very shallow cuts and very deep cuts produced ineffective frequency matching); (5) a crystal having a cut therein leaving a connecting area in the recited range was mounted in the upside down position with the full (uncut) face fastened to the very thin steel diaphragm 21 and one only of the separated faces bonded to the adhesive filling housing 23; and (6) a construction similar to that of crystal 24 was employed with only half of the diaphragm 21 being present and that half being connected to element 27 with the ambient environment being freely accessible to element 26.

It has been further found that a piezoelectric crystal cut such that the mass of the elements 26, 27 separated by the slot 36 should be equal or substantially so in order to optimize frequency matching. The width of the slot 36 is not critical, although the depth is critical in that the depth must separate at least about 30 percent, but not more than about 65 percent of the area common to the crystal portions 26, 27. Thus, the extent of separation shown in FIG. 1 is preferred, being about 50 percent of the cross-section of the crystal 24. For some unknown reason, a connection composed of the original undisturbed crystalline material must remain between elements 26 and 27 to the extent described in order to obtain effective frequency matching over a broad range of frequencies.

The signal picked up from crystal portion 26 and the signal received from crystal portion 27 are compared in the differential amplifier with the result that the unwanted signal quantity is cancelled out leaving only the signal quantity reflecting the pressure force.

Although the crystal 24 has a circular cross-section in the uncut region, the shape of the crystal in this regard is not critical. The diaphragm 21, which is the means for sensory input to crystal 24 of the signal to be detected, should be very thin (about 5 mils thick) so as to minimize the mass differential between portions 26 and 27.

In a typical preparation of the piezoelectric sensing element 24 a wafer of crystal is cut from a rod of the material, i.e., ⅛ inch diameter rod. The opposite faces of the wafer are provided with a conducting coating, as for example, of silver. This application of the conducting coating need not precede the cutting operation, however. Next, the crystal is polarized, following which the slot 36 is introduced, as by sawing in the axial direction into the crystal, and electric connections are made thereto. Connection is then made to the steel diaphragm 21 and the crystal is set on the adhesive mounting material with a clearance between the crystal and the housing 23. The mounting material need only be a good electrical insulator and provide a good bond for the elements connected.

The particular piezoelectric material employed is not critical and may be any one of a number of well known piezoelectric crystal materials, for example, lead-zirconate-titanate, barium titanate, strontium titanate, lead zirconate, etc.

An indication of the very great increase in accuracy made possible in a device according to the construction of this invention is shown by the comparisons in FIGS. 3a and 3b. FIG. 3a shows the millivolt signal output of the prior art pressure measuring gage disclosed in U.S. 3,031,591 as a function of time, while FIG. 3b shows the millivolt signal output for the construction of the instant invention as a function of time. In each instance, the amplification factor employed was 1000, which extent of amplification ordinarily introduces distortion into the signal. It may be seen, however, that in the case of FIG. 3b the base line portion 37 holds a steady and definite value, while the base line portion 38 in FIG. 3a is a wavering, indecisive sloping line. In the latter case, it may be appreciated that it is impossible to definitely establish the requisite base line in order to record pressure changes relative thereto.

Calibration of these gages such that the millivolt output therefrom will be indicative of particular pressure values is accomplished in a 1.5 Mach shock tube employing various pressures to establish pressure steps at the sensing station extending from a value of about 0.0007 p.s.i. to higher values of pressure productive of a generally srtaight-line variation. Calibration of crystals compensated in accordance with this invention can be accomplished successfully even before introduction thereof into the ultimate environment in connection in which pressures are to be detected. It is particularly advantageous to provide absolute calibration in this manner as this obviates the necessity of providing large calibration tubes to accommodate very large models in which such sensors would be employed.

What we claim as new and desire to secure by Letters Patent of the United States is:

1. An improved device for the generation of small voltages in response to the application of forces to a sensing element comprising in combination:
   (a) a housing,
      (1) a portion of the wall area of said housing being thin and flexible,
   (b) a piezoelectric crystal mounted in said housing,
      (1) said crystal having opposite first and second flat faces, the surface of each face being electrically conducting,
      (2) said crystal having a slot extending into the body thereof through said first flat face such that first and second crystal portions are formed having first and second conducting segments of said first flat face, respectively, which crystal portions remain connected by a common region of the orginal crystalline material,
      (3) said first crystal portion being rigidly connected to said flexible portion of wall area over said first segment and being electrically insulated from said flexible portion of wall area,
      (4) said second crystal portion being free of direct connection to said flexible portion of wall area,
      (5) said crystal being retained in position in said housing by a rigid connection between said housing and said second flat face and being electrically insulated from said housing,
   (c) first electrically conducting means connected to said first segment for carrying voltage therefrom,
   (d) second electrically conducting means connected to said second segment for carrying voltage therefrom, and
   (e) third electrically conducting means connected to said second flat face for grounding thereof,
      (1) each of said first, second and third electrically conducting means being electrically insulated from the wall of said housing and extending therethrough.

2. The improved device for the generation of small voltages substantially as recited in claim 1 wherein the masses of the first and second crystal portions are substantially equal on either side of a plane passing through the bottom of the slot and in a direction substantially perpendicular to the second flat face.

3. The improved device for the generation of small voltages substantially as recited in claim 2 wherein the common region measured in the plane passing through the bottom of the slot has a cross-sectional area of between about 35 percent and about 70 percent of the original cross-sectional area of the crystal as measured in said plane.

4. An improved device for the generation of small voltages in response to the application of forces to a sensing element comprising in combination:
   (a) a closed housing,
      (1) a portion of the wall area of said housing being thin and flexible,
   (b) a piezoelectric crystal mounted in said housing,
      (1) said crystal having opposite first and second flat faces, the surface of each face being electrically conducting,
      (2) said crystal having a slot extending into the body thereof through said first flat face such that first and second crystal portions are formed having first and second conducting segments of said first flat face, respectively, which crystal portions remain connected by a common region of the original crystalline material,
      (3) said common region having a cross-sectional area measured in a plane passing through the bottom of said slot and in a direction substantially perpendicular to said second flat face of between about 35 percent and about 70 percent of the original cross-sectional area of said crystal measured in said plane,
      (4) said first crystal portion being rigidly connected to said flexible portion of wall area over said first segment and being electrically insulated from said flexible portion of wall area,
      (5) said second crystal portion being free of direct connection to said flexible portion of wall area,
      (6) said crystal being retained in position in said housing by a rigid connection between said housing and said second flat face and being electrically insulated from said housing,
   (c) first electrically conducting means connected to said first segment for carrying voltage therefrom,
   (d) second electrically conducting means connected to said second segment for carrying voltage therefrom, and
   (e) third electrically conducting means connected to said second flat face for grounding thereof,
      (1) each of said first, second and third electrically conducting means being electrically insulated from the wall of said housing and extending therethrough.

5. The improved device for the generation of small voltages substantially as recited in claim 4 wherein the masses of the first and second crystal portions are substantially equal on either side of the plane.

6. The improved device for the generation of small voltages substantially as recited in claim 4 wherein the first and second crystal portions are frequency matched over a range of frequencies extending up to about 25,000 cycles per second.

7. The improved device for the generation of small voltages substantially as recited in claim 4 wherein the slot is centrally located and extends about halfway through the thickness of the crystal.

References Cited

UNITED STATES PATENTS

| | | | |
|---|---|---|---|
| 2,587,304 | 2/1952 | Fiske | 310—8.8 |
| 2,917,642 | 12/1959 | Wright | 310—8.7 |
| 3,031,591 | 4/1962 | Cary | 310—8.7 |
| 3,033,027 | 5/1962 | Perls | 310—8.7 |
| 3,086,132 | 4/1963 | Ostrow | 310—8.8 |
| 3,146,360 | 8/1964 | Marshall | 310—8.7 |
| 3,283,182 | 11/1966 | Jones | 310—8.7 |
| 3,269,175 | 8/1966 | Sprosty | 310—8.7 |
| 3,322,980 | 5/1967 | Faure | 310—9.1 |

J. D. MILLER, *Primary Examiner.*